US009639999B2

(12) United States Patent
Chowdhury et al.

(10) Patent No.: US 9,639,999 B2
(45) Date of Patent: May 2, 2017

(54) SYSTEM AND METHOD FOR ESTIMATING SPEED OF A VEHICLE

(71) Applicant: Tata Consultancy Services Limited, Mumbai, Maharashtra (IN)

(72) Inventors: Arijit Chowdhury, Kolkata (IN); Tapas Chakravarty, Kolkata (IN); Balamuralidhar Purushothaman, Bangalore (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 101 days.

(21) Appl. No.: 14/658,702

(22) Filed: Mar. 16, 2015

(65) Prior Publication Data

US 2016/0203660 A1    Jul. 14, 2016

(30) Foreign Application Priority Data

Jan. 14, 2015   (IN) ............................ 141/MUM/2015

(51) Int. Cl.
  *G01C 21/16*     (2006.01)
  *G07C 5/08*      (2006.01)
  (Continued)

(52) U.S. Cl.
  CPC ......... *G07C 5/0841* (2013.01); *B60W 40/105* (2013.01); *B60W 40/107* (2013.01);
  (Continued)

(58) Field of Classification Search
  None
  See application file for complete search history.

(56) References Cited

U.S. PATENT DOCUMENTS

| 8,477,703 B2 * | 7/2013 | Sun ................... H04W 72/1215 370/329 |
| 8,577,703 B2 | 11/2013 | McClellan et al. |

(Continued)

OTHER PUBLICATIONS

Aljaafreh; "Web Driving Performance Monitoring System"; World Academy of Science, Engineering and Technology, vol. 6:10-28 (2012).

(Continued)

*Primary Examiner* — John R Olszewski
*Assistant Examiner* — Jess Whittington
(74) *Attorney, Agent, or Firm* — Merchant & Gould P.C.

(57) ABSTRACT

System and method for estimating speed of a vehicle is disclosed. Speed of a vehicle is recorded using a first sensor at a time interval of a plurality of time intervals. Further, an acceleration of the vehicle may be recorded using a second sensor at each sub-interval of the time interval. At each sub-interval, a forward speed and a backward speed, of the vehicle are obtained based upon the acceleration at each sub-interval. After obtaining the forward speed and the backward speed, a predefined weight may be assigned to the forward speed and the backward speed at each sub-interval. Subsequently, a corrected speed of the vehicle at each sub-interval is calculated based upon the predefined weight, the forward speed and the backward speed. Further, a slope associated with the speed of the vehicle is determined Based upon the slope, the speed of the vehicle at a sub-interval may be estimated.

7 Claims, 3 Drawing Sheets

(51) Int. Cl.
  *G01P 3/00* (2006.01)
  *B60W 40/107* (2012.01)
  *B60W 40/105* (2012.01)
  *G01P 3/50* (2006.01)
  *G01P 7/00* (2006.01)

(52) U.S. Cl.
  CPC ........... *G01C 21/16* (2013.01); *G01C 21/165* (2013.01); *G01P 3/00* (2013.01); *G01P 3/50* (2013.01); *G01P 7/00* (2013.01)

(56) References Cited

U.S. PATENT DOCUMENTS

| | | | |
|---|---|---|---|
| 8,595,037 B1 | 11/2013 | Hyde et al. | |
| 2010/0131124 A1* | 5/2010 | Klooster | G08G 5/0052 701/3 |
| 2012/0330545 A1* | 12/2012 | Suzuki | G01C 21/165 701/472 |
| 2013/0218604 A1* | 8/2013 | Hagelstein | G06Q 40/08 705/4 |
| 2014/0148972 A1 | 5/2014 | Basir et al. | |
| 2014/0257870 A1 | 9/2014 | Cielocha et al. | |
| 2014/0278206 A1* | 9/2014 | Girod | G01C 15/00 702/141 |

OTHER PUBLICATIONS

Toledo et al. "In-Vehicle Data Recorder for Evaluation of Driving Behavior and Safety" Transportation Research Record. pp. 112-119 (1953).

* cited by examiner

SYSTEM AND METHOD FOR ESTIMATING SPEED OF A VEHICLE

CROSS REFERENCE TO RELATED APPLICATIONS

The present application claims priority from an Indian patent application numbered 141/MUM/2015 filed on 14 Jan. 2015.

TECHNICAL FIELD

The present disclosure in general relates to estimating speed of a vehicle. More particularly, the present disclosure relates to a system and method for estimating speed of a vehicle using acceleration data and GPS data.

BACKGROUND

There have been several methods available to estimate speed of a vehicle while in motion. Generally, the speed of the vehicle is measured using an On-Board diagnostics system (OBD). For example, the OBD system may have a plurality of sensors such as an accelerometer, and a GPS to measure the speed. In recent times, portable electronic devices are used to measure the speed. Specifically, the portable electronic devices comprise the plurality of sensors to measure the speed. When using the portable electronic devices, use of the sensors such as the GPS sensor may drain battery of the portable electronic devices. Further, the GPS sensors may not estimate the speed accurately when the portable electronic devices are moving in a tunnel Further, when the portable electronic devices are carried in the vehicle when moving between various geographies, the GPS sensor may not estimate the speed accurately due to poor reception of signals from a satellite.

In addition, the GPS sensors estimate the speed at low sampling rates. In one scenario, the GPS sensor may measure the speed at a time interval of 10 seconds. In another scenario, the GPS sensor may measure the speed at the time interval of 5 seconds. In order to estimate the speed accurately in a granular level, several methods have been proposed. One such approach includes fusing values of the GPS sensor with values received from an inertial sensor. However, when the vehicle is moving, the values measured using the above approach may have several errors such as bias, noise etc. The errors may degrade estimation of the speed resulting in large divergence in speed estimation.

SUMMARY

This summary is provided to introduce concepts related to systems and methods for estimating speed of a vehicle and the concepts are further described below in the detailed description. This summary is not intended to identify essential features of the claimed subject matter nor is it intended for use in determining or limiting the scope of the claimed subject matter.

In one implementation, a method for estimating speed of a vehicle is disclosed. The method comprises recording, by a processor, a speed of a vehicle using a first sensor at a time interval of a plurality of time intervals. The method further comprises recording, by the processor, an acceleration of the vehicle using a second sensor. The acceleration is recorded at each sub-interval of the time interval. The method further comprises obtaining, by the processor, a forward speed and a backward speed, of the vehicle at each sub-interval based upon the acceleration at each sub-interval. The method further comprises assigning, by the processor, a predefined weight to the forward speed and the backward speed at each sub-interval. The method further comprises calculating, by the processor, a corrected speed of the vehicle at each sub-interval based upon the predefined weight, the forward speed and the backward speed. The method further comprises determining, by the processor, a slope associated with the speed of the vehicle. The slope indicates change in the speed of the vehicle between the plurality of time intervals. The method further comprises estimating, by the processor, the speed of the vehicle at a sub-interval based upon the slope. The speed is estimated using one of the corrected speed at the sub-interval, minimum of the forward speed and the backward speed in the time interval and maximum of the forward speed and the backward speed in the time interval.

In one implementation, a system for estimating speed of a vehicle is disclosed. The system comprises a processor and a memory coupled to the processor. The processor executes program instructions stored in the memory. The processor executes the program instructions to record a speed of a vehicle using a first sensor at a time interval of a plurality of time intervals. The processor further executes the program instructions to record an acceleration of the vehicle using a second sensor. The acceleration is recorded at each sub-interval of the time interval. The processor further executes the program instructions to obtain a forward speed and a backward speed, of the vehicle at each sub-interval based upon the acceleration at each sub-interval. The processor further executes the program instructions to assign a predefined weight to the forward speed and the backward speed at each sub-interval. The processor further executes the program instructions to calculate a corrected speed of the vehicle at each sub-interval based upon the predefined weight, the forward speed and the backward speed. The processor further executes the program instructions to determine a slope associated with the speed of the vehicle. The slope indicates change in the speed of the vehicle between the plurality of time intervals. The processor further executes the program instructions to estimate the speed of the vehicle at a sub-interval based upon the slope, wherein the speed is estimated using one of the corrected speed at the sub-interval, minimum of the forward speed and the backward speed in the time interval, and maximum of the forward speed and the backward speed in the time interval.

In one implementation, a non-transitory computer readable medium embodying a program executable in a computing device for estimating speed of a vehicle is disclosed. The program comprises a program code for recording a speed of a vehicle using a first sensor at a time interval of a plurality of time intervals. The program further comprises a program code for recording an acceleration of the vehicle using a second sensor. The acceleration is recorded at each sub-interval of the time interval. The program further comprises a program code for obtaining a forward speed and a backward speed, of the vehicle at each sub-interval based upon the acceleration at each sub-interval. The program further comprises a program code for assigning a predefined weight to the forward speed and the backward speed at each sub-interval. The program further comprises a program code for calculating a corrected speed of the vehicle at each sub-interval based upon the predefined weight, the forward speed and the backward speed. The program further comprises a program code for determining a slope associated with the speed of the vehicle. The slope indicates change in the speed of the vehicle between the plurality of time intervals. The program further comprises estimating the speed of the vehicle at a sub-interval based upon the slope, wherein the speed is estimated using one of the corrected speed at the sub-interval, minimum of the forward speed and the backward speed in the time interval, and maximum of the forward speed and the backward speed in the time interval.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like/similar features and components.

DETAILED DESCRIPTION

The present disclosure relates to a system and a method for estimating speed of a vehicle. At first, speed of a vehicle using a first sensor may be recorded. The speed may be recorded at a time interval of a plurality of time intervals. The first sensor may comprise a Global Positioning System (GPS) sensor and an Inertial Navigation System (INS) sensor. In one example, the first sensor may be an accelerometer sensor. At the time interval, an acceleration of the vehicle may be recorded using a second sensor. In one example, the second sensor may comprise an accelerometer, and a Micro-Electro-Mechanical Systems (MEMS). The acceleration may be recorded at each sub-interval of the time interval. At each sub-interval, a forward speed and a backward speed, of the vehicle may be obtained. The forward speed and the backward speed at each sub-interval may be obtained based upon the acceleration at each sub-interval. After obtaining the forward speed and the backward speed, a predefined weight may be assigned to the forward speed and the backward speed at each sub-interval. Subsequently, a corrected speed of the vehicle at each sub-interval may be calculated based upon the predefined weight, the forward speed and the backward speed.

In order to estimate the speed, a slope associated with the speed of the vehicle may be determined The slope may indicate a change in the speed of the vehicle between the plurality of time intervals. Based upon the slope, the speed of the vehicle at a sub-interval may be estimated. In one example, the speed may be estimated using the corrected speed at the sub-interval. In another example, the speed may be estimated using minimum of the forward speed and the backward speed in the time interval. In another example, the speed may be estimated using maximum of the forward speed and the backward speed in the time interval.

While aspects of described system and method for estimating speed of a vehicle may be implemented in any number of different computing systems, environments, and/or configurations, the embodiments are described in the context of the following exemplary system.

Figure 1:
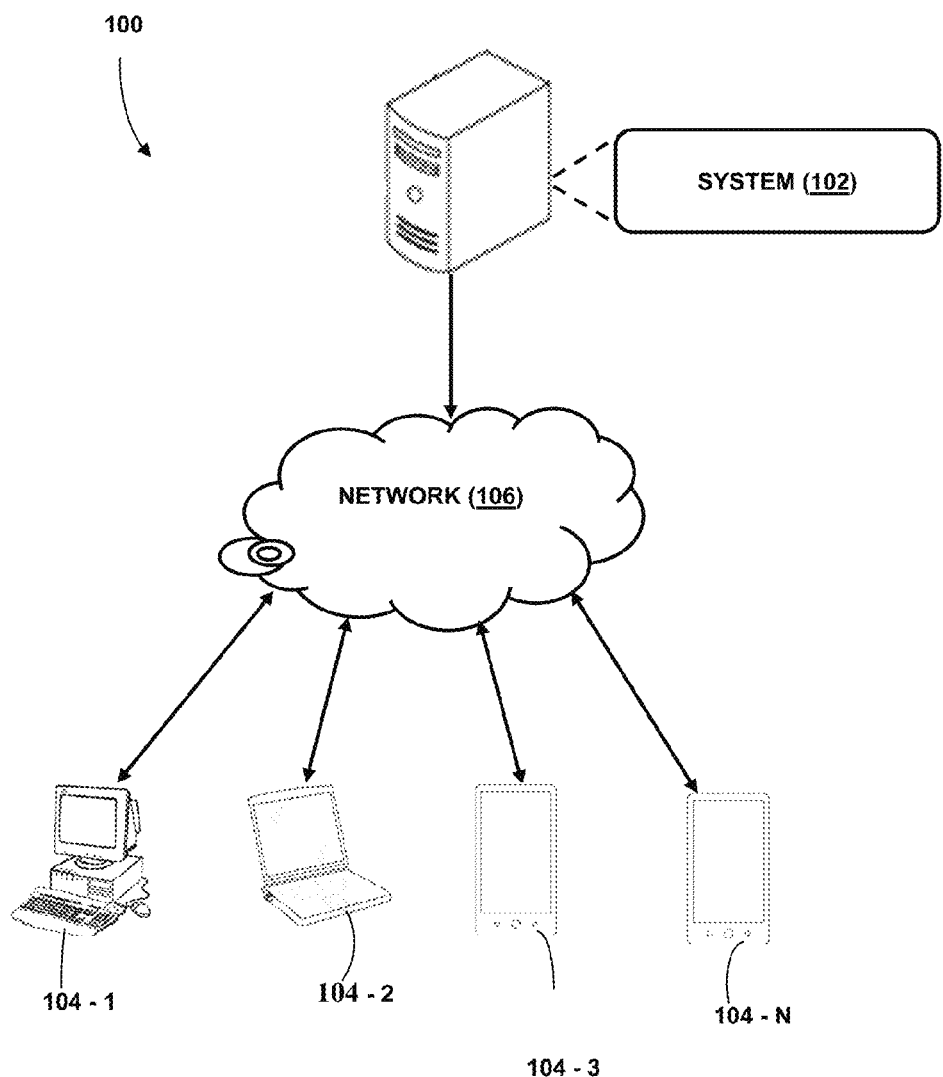
FIG. 1 illustrates a network implementation of a system for estimating speed of a vehicle, in accordance with an embodiment of the present disclosure.

Referring now to FIG. 1, a network implementation 100 of a system 102 for estimating speed of a vehicle is illustrated, in accordance with an embodiment of the present disclosure. The system 102 may record a speed of a vehicle using a first sensor at a time interval of a plurality of time intervals. At the time interval, the system 102 may record an acceleration of the vehicle using a second sensor. In other words, the system 102 may record the acceleration at each sub-interval of the time interval. At each sub-interval, the system 102 may obtain a forward speed and a backward speed, of the vehicle based upon the acceleration at each sub-interval. After obtaining the forward speed and the backward speed, the system 102 may assign a predefined weight to the forward speed and the backward speed at each sub-interval.

Subsequently, the system 120 may calculate a corrected speed of the vehicle at each sub-interval based upon the predefined weight, the forward speed and the backward speed. Further, the system 102 may determine a slope associated with the speed of the vehicle. Based on the slope, the system 102 may estimate the speed of the vehicle at a sub-interval. The system 102 may estimate speed using one of the corrected speed at the sub-interval, minimum of the forward speed and the backward speed in the time interval and maximum of the forward speed and the backward speed in the time interval.

Although the present disclosure is explained by considering that the system 102 is implemented as a software application on a server, it may be understood that the system 102 may also be implemented in a variety of computing systems, such as a laptop computer, a desktop computer, a notebook, a workstation, a mainframe computer, a server, a network server, cloud, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
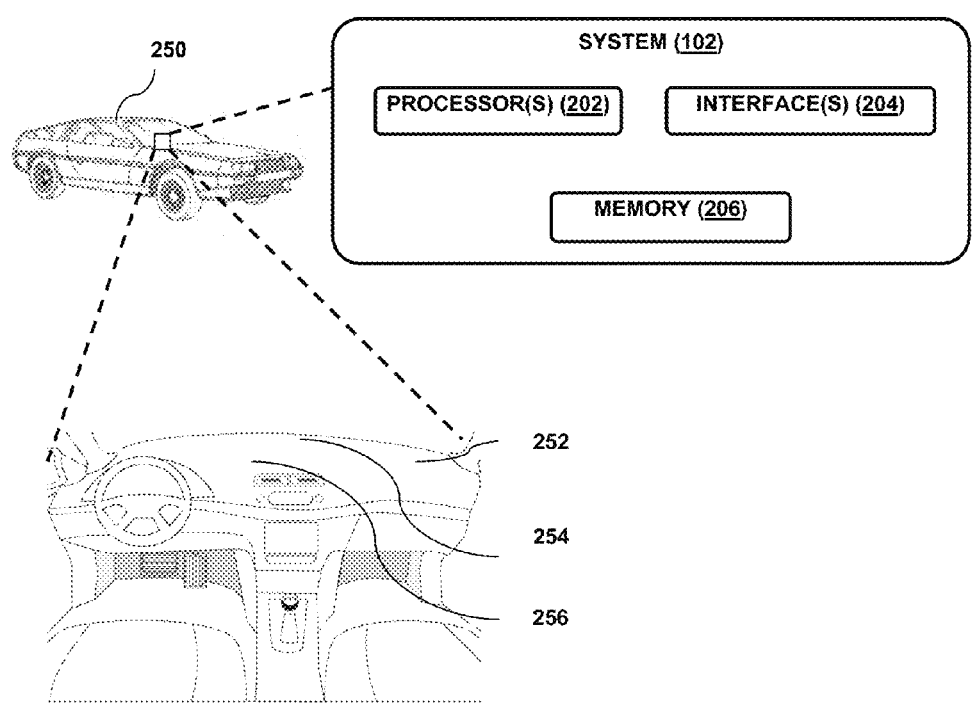
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, at first, the user may use the client device 104 to access the system 102 via the I/O interface 204. The working of the system 102 may be explained in detail using FIG. 2. The system 102 may be used for estimating speed of a vehicle 250. In one implementation, the vehicle 250 may comprise an On-Board Diagnostic (OBD) system 252. In order to estimate the speed of the vehicle 250, the system 102 may communicate with the vehicle 250. Specifically, the system 102 may communicate with the OBD system 252 of the vehicle 250. In one example, the OBD 252 may comprise a plurality of sensors to record the speed and an acceleration of the vehicle 250 when the vehicle 250 is in motion. Specifically, the OBD 252 may comprise a first sensor 254 to record the speed of the vehicle 250. Further, the OBD 252 may comprise a second sensor 256 to record the acceleration of the vehicle 250. In one example, the first sensor 254 may comprise at least one of a Global Positioning System (GPS) sensor and an Inertial Navigation System (INS) sensor. In one example, the first sensor 254 may be an accelerometer sensor. In one example, the second sensor 256 may comprise an accelerometer, and a Micro-Electro-Mechanical Systems (MEMS).

In one implementation, the system 102 may communicate with a portable electronic device (not shown) present in the vehicle 250. The portable electronic device may comprise the plurality of sensors to record the speed and the acceleration of the vehicle 250. The portable electronic device may comprise a smart phone, a laptop, a tablet, a wrist watch, a smart watch, etc. The plurality of sensors in the portable electronic device may comprise a GPS sensor and an accelerometer. The GPS sensor may be used to record the speed of the vehicle 250. Further, the accelerometer sensor may be used to record the acceleration of the vehicle 250. After recording, the portable electronic device may communicate the speed and the acceleration to the system 102.

The system 102 may record the speed of the vehicle 250 using the first sensor 254 at a time interval of a plurality of time intervals. Specifically, the system 102 may record position coordinates in latitude and longitude, the speed and horizontal accuracy of the vehicle 250. The system 102 may record the speed at the time intervals with a predefined sampling frequency when the vehicle 250 is in the motion. In one example, the speed of the vehicle 250 may be recorded at the time interval of 10 seconds. In another example, the speed of the vehicle 250 may be recorded at the time interval of 20 seconds. In one example, the predefined sampling frequency may be determined as 0.1 Hz-1 Hz.

Similarly, the system 102 may record the acceleration using the second sensor 256. The system 102 may record the acceleration record at plurality of sub-intervals of the time interval. The second sensor 256 may record the acceleration at a frequency of 10 Hz. In another example, the second sensor 256 may record the acceleration at a frequency of 20 Hz. As the frequency of the second sensor 256 is more, the second sensor 256 may able to capture more samples in the time interval. For example, consider the first sensor 254 records speed at the time interval of 10 seconds at a frequency of 1 Hz. Further, consider the second sensor 256 records the acceleration at a frequency of 10 Hz. The second sensor 245 may be able to capture the acceleration in 10 sub-intervals. In other words, at each sub-interval one sample of the acceleration may be recorded using the second sensor 256. For the above example, there may be two values of the speed at two instances from the first sensor 254 and ten values of the acceleration at each sub-interval from the second sensor 256.

In other words, the acceleration may be recorded at the frequency (Fs) Hz. The speed may be recorded using the first sensor 254 at the time interval; e.g., n seconds. In one example, the n may be 5 seconds. In another example, n may be 10 seconds. For example, if n is 10 indicating that the speed is recorded at the time interval of 10 seconds. Upon inferring the acceleration at 1/Fs second sub-intervals, the time interval T may be defined as n*Fs.

After recording the speed and the acceleration, a forward speed and a backward speed of the vehicle at each sub-interval may be obtained. The forward speed and the backward speed may be obtained based upon the acceleration at each sub-interval. In order to explain obtaining the forward speed and the backward speed, an example may be used. Consider the speed is recorded in the time interval of 10 seconds using the first sensor 254. Consider the speed at 0 second is recorded as 45.8324064 Kmph ($V_i$). $V_i$ may indicate an initial value of the speed. Consider the speed at 10 second is recorded as 45.310716 Kmph ($V_f$). $V_f$ may indicate an end value of the speed. Simultaneously; the acceleration may be recorded using the second sensor 256. The acceleration may be recorded at sub-intervals i.e., at every second of the time interval. In order to illustrate recording of the acceleration at each sub-interval, Table 1 may be used as an example. Specifically, Table 1 shows the acceleration recorded at each sub-interval and the speed recorded at the time interval.

TABLE 1

Table 1: Acceleration recorded at each sub-interval and the speed recorded at the time interval

| Acceleration (meter/second$^2$ (m/s$^2$)) | Speed (Kilometre/hour (Kmph)) |
|---|---|
| −0.174093583 ($A_0$) | 45.8324064 ($V_i$) |
| −0.053405703 ($A_1$) | |
| 0.262005459 ($A_2$) | |
| −0.144682252 ($A_3$) | |
| 0.014544619 ($A_4$) | |
| −0.340419738 ($A_5$) | |
| −0.191334703 ($A_6$) | |
| 0.003388594 ($A_7$) | |
| 0.037870831 ($A_8$) | |
| −0.140625515 ($A_9$) | |
| 0.029757377 ($A_{10}$) | 45.310716 ($V_e$) |

Referring to Table 1, at each sub-interval the acceleration may be recorded using the second sensor 254. For the example shown in Table 1, the acceleration A1, A2, A3, . . . $A_n$ may be recorded at each sub-interval $t_1$, $t_2$, $t_3$, . . . $_n$ and so on. After recording the speed and the acceleration, the forward speed and the backward speed of the vehicle at each sub-interval may be obtained. In one implementation, the forward speed may be obtained using the initial value of the speed and integrating the acceleration for a given sub-interval. In other words, the forward speed may be obtained using $$V(t2) = V(t1) + \int_{t1}^{t2} a(t) \cdot dt.$$

V(t2) may indicate the speed at sub-interval $t_2$. V(t1) may indicate the speed at sub-interval $t_1$. a(t) may indicate acceleration from the sub-interval $t_1$ to $t_2$.

For the above example, the forward speed at sub-interval $t_1$ may be obtained as using V(1f)=V(i)+(A0+A1)/2.

In other words, V(1f)=45.8324064+((−0.174093583+(−0.053405703))/2)*3.6. As the acceleration recorded is in m/s and the speed recorded is in Kmph, a factor of 3.6 may be used to convert the acceleration in m/s to Kmph The forward speed at $t_1$ for the example may be obtained as 46.24190511. Subsequently, the forward speed at sub-interval $t_2$ may be calculated using V(2f)=V(1)+((A1+A2)/2)*3.6). For the above example, the forward speed at sub-interval $t_2$ may be obtained as V(2f)=46.24190511+((0.2620054592+(−0.053405703))/2)*3.6. For the example, the forward speed at sub-interval $t_2$ may be obtained 45.86642555. Similarly, the forward speed for each sub-interval may be calculated.

In order to obtain the backward speed, the end value of the speed in the time interval and integration of the acceleration at a given sub-interval may be used. In other words, the backward speed for each sub-interval may be calculated from the end value of the speed to the initial value of the speed by considering the acceleration at the sub-interval. The backward speed at the sub-interval $t_9$ may be obtained using $$V(t9) = V(t10) - \int_{t9}^{t10} a(t) \cdot dt.$$

V(t9) may indicate the backward speed at the sub-interval $t_9$. V(t10) may indicate the speed at the time interval Vf. a(t) may indicate acceleration from sub-interval $t_{10}$ to $t_9$.

For the above example, the backward speed at sub-interval $t_9$ may be obtained as V(9b)=V(e)−(A9+A10)/2. In other words, V(1f)=45.310716−((0.0297573765+(−0.1406255148))/2)*3.6. As the acceleration recorded is m/s and the speed recorded is Kmph, a factor of 3.6 may be used to convert the acceleration in m/s to Kmph The backward speed at $t_9$ for the example may be obtained 45.11115335. Subsequently, the backward speed at sub-interval $t_8$ may be calculated using V(8b)=V(9)−((A8+A9)/2)*3.6). For the above example, the backward speed at sub-interval $t_2$ may be obtained as V(2f)=45.1111535−((0.0378708308+(−0.1406255148))/2)*3.6. For the example, the backward speed at sub-interval $t_8$ may be obtained as 44.92619492. Similarly, the backward speed for each sub-interval may be calculated.

For the example presented in Table 1, the forward speed and the backward speed obtained may be illustrated in Table 2.

TABLE 2

Table 2: Forward speed and the backward speed

| Acceleration (meter/second² (m/s²)) | Speed (Kilometre/hour (Kmph)) | Forward Speed ($V_f$) | Backward Speed ($V_b$) |
|---|---|---|---|
| −0.174093583 ($A_0$) | 45.8324064 | 45.8324064 | 45.8324064 |
| −0.053405703 ($A_1$) | | 46.24190511 | 43.47083928 |
| 0.262005459 ($A_2$) | | 45.86642555 | 43.09535972 |
| −0.144682252 ($A_3$) | | 45.65524378 | 42.88417795 |
| 0.014544619 ($A_4$) | | 45.88949152 | 43.11842568 |
| −0.340419738 ($A_5$) | | 46.47606673 | 43.7050009 |
| −0.191334703 ($A_6$) | | 47.43322472 | 44.66215889 |
| 0.003388594 ($A_7$) | | 47.77152772 | 45.00046188 |
| 0.037870831 ($A_8$) | | 47.69726075 | 44.92619492 |
| −0.140625515 ($A_9$) | | 47.88221919 | 45.11115335 |
| 0.029757377 ($A_{10}$) | 45.310716 | 45.310716 | 45.310716 |

After obtaining the forward speed and the backward speed, a predefined weight may be assigned at each the sub-interval. In one implementation, the pre-defined weight may be assigned for the forward speed at a sub-interval using $W_{ft}=(T-t)/T$. $W_{ft}$ may indicate the pre-defined weight assigned at the sub-interval t for the forward speed. T may indicate number of the sub-intervals in the time interval. In one implementation, the pre-defined weight may be assigned for the backward speed at sub-interval using $W_{bt}=(t)/T$. $W_{bt}$ may indicate the pre-defined weight assigned at the sub-interval t for the backward speed. T may indicate number of the sub-intervals in the time interval.

In order to explain assigning the pre-defined weight, an example may be used. Consider the sub-interval $t_4$ for the forward speed. The pre-defined weight for the sub-interval $t_4$ may be assigned as $W_4=(10-4)/10=0.6$. Similarly, consider the sub-interval $t_7$ for the forward speed. The pre-defined weight for the sub-interval $t_7$ may be assigned as $W_7=(10-7)/10=0.3$. In another example, consider the sub-interval $t_4$ for the backward speed. The pre-defined weight for the sub-interval $t_4$ may be assigned as $W_4=(4)/10=0.4$. Similarly, the pre-defined weight may be assigned for each sub-interval. The pre-defined weights assigned for the example shown in Table 2 may be illustrated in Table 3.

TABLE 3

Table 3: Assigning Pre-defined Weight

| Sub-interval | Pre-defined Weight for Forward Speed | Pre-defined Weight for Backward Speed |
|---|---|---|
| 1 | .9 | .1 |
| 2 | .8 | .2 |
| 3 | .7 | .3 |
| 4 | .6 | .4 |
| 5 | .5 | .5 |
| 6 | .4 | .6 |
| 7 | .3 | .7 |
| 8 | .2 | .8 |
| 9 | .1 | .9 |

After assigning the pre-defined weight to the forward speed and the backward speed at each sub-interval, a corrected speed of the vehicle 250 at each sub-interval may be calculated. The corrected speed may be calculated based upon the predefined weight, the forward speed and the backward speed. The corrected speed at any given sub-interval may be calculated using $\bar{v}_t=(Wft*Vft)+(Wbt*Vbt)$. $\bar{v}_t$ may indicate the corrected speed at the sub-interval t. Wft may indicate the pre-defined weight assigned at the sub-interval t for the forward speed. Vft may indicate the forward speed at the sub-interval t. Wbt may indicate the pre-defined weight assigned at the sub-interval t for the backward speed. Vft may indicate the backward speed at the sub-interval t.

For the example shown in Table 2 and 3, the corrected speed of the vehicle 250 may be calculated at each sub-interval. In one example, consider the sub-interval $t_2$. At the sub-interval $t_2$, the corrected speed may be calculated as $\overline{v2}=(Vf2*Wf2)+(Vb2*Wb2)$. For the example, the corrected speed at sub-interval $t_2$ may be calculated as $\overline{v2}=(45.86642555*0.8)+(43.09535972*0.2)=45.31221239$. Similarly, the corrected speed may be calculated for each sub-interval. For the example shown in Table 2 and 3, the corrected speed calculated may be presented as shown in Table 4.

vehicle 250 may be determined. In one example, the slope may be determined using a slope check algorithm. The slope may indicate a change in the speed of the vehicle 250 between the plurality of the time intervals. Consider the plurality of time intervals as T, i.e., T0-T1, T1-T2, T2-T3 and so on. In other words, the slope may be determined using the slope check algorithm by checking the speed at the time interval T0 and T1. Similarly, the change in the speed of the vehicle 250 between T1 and T2 may be checked. In order to illustrate determining the slope, Table 5 may be used

TABLE 4

Table 4: Corrected speed calculation

| Sub-interval (t) | Acceleration (meter/second$^2$ (m/s$^2$)) | Speed (Kilometre/hour (Kmph)) | Forward Speed ($V_f$) | Backward Speed ($V_b$) | Corrected Speed (Kmph) |
|---|---|---|---|---|---|
|   | −0.174093583 (A$_0$) | 45.8324064 | 45.8324064 | 45.8324064 | 45.8324064 |
| 1 | −0.053405703 (A$_1$) |  | 46.24190511 | 43.47083928 | 45.96479853 |
| 2 | 0.262005459 (A$_2$) |  | 45.86642555 | 43.09535972 | 45.31221239 |
| 3 | −0.144682252 (A$_3$) |  | 45.65524378 | 42.88417795 | 44.82392403 |
| 4 | 0.014544619 (A$_4$) |  | 45.88949152 | 43.11842568 | 44.78106518 |
| 5 | −0.340419738 (A$_5$) |  | 46.47606673 | 43.7050009 | 45.09053381 |
| 6 | −0.191334703 (A$_6$) |  | 47.43322472 | 44.66215889 | 45.77058522 |
| 7 | 0.003388594 (A$_7$) |  | 47.77152772 | 45.00046188 | 45.83178164 |
| 8 | 0.037870831 (A$_8$) |  | 47.69726075 | 44.92619492 | 45.48040809 |
| 9 | −0.140625515 (A$_9$) |  | 47.88221919 | 45.11115335 | 45.38825993 |
|   | 0.029757377 (A$_{10}$) | 45.310716 | 45.310716 | 45.310716 | 45.310716 |

After calculating the corrected speed at each sub-interval of the time interval, a slope associated the speed of the an example. Specifically, Table 5 shows the change in the speed i.e., Va at T0 and Vb at T1.

TABLE 5

Table 5: Determining slope

| Sub-interval | Acceleration (meter/second2 (m/s2)) | Speed (Kilometre/hour (Kmph)) | Forward Speed (Vf) | Backward Speed (Vb) | Corrected Speed (Kmph) | Change in Speed |
|---|---|---|---|---|---|---|
| T0 | −0.174093583 | 45.8324064 | 45.8324064 | 45.8324064 | 45.8324064 | Va |
| 1 | −0.053405703 | 46.9438164 | 46.24190511 | 43.47083928 | 45.96479853 |  |
| 2 | 0.262005459 | 46.1382336 | 45.86642555 | 43.09535972 | 45.31221239 |  |
| 3 | −0.144682252 | 44.6972868 | 45.65524378 | 42.88417795 | 44.82392403 |  |
| 4 | 0.014544619 | 44.7261408 | 45.88949152 | 43.11842568 | 44.78106518 |  |
| 5 | −0.340419738 | 45.4635828 | 46.47606673 | 43.7050009 | 45.09053381 |  |
| 6 | −0.191334703 | 46.2616488 | 47.43322472 | 44.66215889 | 45.77058522 |  |
| 7 | 0.003388594 | 47.2143528 | 47.77152772 | 45.00046188 | 45.83178164 |  |
| 8 | 0.037870831 | 47.3643792 | 47.69726075 | 44.92619492 | 45.48040809 |  |
| 9 | −0.140625515 | 46.586745 | 47.88221919 | 45.11115335 | 45.38825993 |  |
| T1 | 0.029757377 | 45.310716 | 45.310716 | 45.310716 | 45.310716 | Vb |
| 11 | −0.186263787 | 45.6870132 | 45.59242754 | 48.88460144 | 48.88460144 |  |
| 12 | 0.131175752 | 46.6823628 | 45.691586 | 48.9837599 | 48.9837599 |  |
| 13 | 0.00541696 | 47.8416564 | 45.44571912 | 48.73789302 | 48.73789302 |  |
| 14 | 0.068296356 | 48.7370124 | 45.31303515 | 48.60520905 | 48.60520905 |  |
| 15 | −0.079774485 | 49.6314324 | 45.33369578 | 48.62586968 | 48.62586968 |  |
| 16 | −0.083831221 | 50.8410864 | 45.62818605 | 48.92035995 | 48.92035995 |  |
| 17 | 0.187970028 | 50.6915496 | 45.4407362 | 48.7329101 | 48.7329101 |  |
| 18 | 0.119005555 | 49.3020972 | 44.88818015 | 48.18035405 | 48.18035405 |  |
| 19 | 0.060182881 | 48.0665376 | 44.56564097 | 47.85781487 | 47.85781487 |  |
| T2 | 0.000346045 | 47.7488628 | 47.7488628 | 47.7488628 | 47.7488628 | Vc |
| 21 | 0.012516242 | 47.791341 | 47.72571068 | 49.57601809 | 47.72571068 |  |
| 22 | 0.035842465 | 47.6625096 | 47.63866501 | 49.48897242 | 47.63866501 |  |
| 23 | 0.036856658 | 47.9884824 | 47.50780659 | 49.358114 | 47.50780659 |  |
| 24 | −0.134540412 | 48.4919838 | 47.68363735 | 49.53394475 | 47.68363735 |  |
| 25 | 0.002374411 | 48.9019896 | 47.92153615 | 49.77184356 | 47.92153615 |  |
| 26 | 0.229551589 | 48.8975004 | 47.50406935 | 49.35437676 | 47.50406935 |  |
| 27 | 0.053083609 | 49.1512464 | 46.99532599 | 48.8456334 | 46.99532599 |  |
| 28 | −0.016895089 | 49.3366284 | 46.93018666 | 48.78049406 | 46.93018666 |  |

TABLE 5-continued

Table 5: Determining slope

| Sub-interval | Acceleration (meter/second2 (m/s2)) | Speed (Kilometre/hour (Kmph)) | Forward Speed (Vf) | Backward Speed (Vb) | Corrected Speed (Kmph) | Change in Speed |
|---|---|---|---|---|---|---|
| 29 | −0.040221312 | 49.4118936 | 47.03299618 | 48.88330359 | 47.03299618 | |
| T3 | −0.197419808 | 49.3110576 | 49.3110576 | 49.3110576 | 49.3110576 | Vd |

In order to determine the slope, the change in the speed i.e., Va at T0 and Vb at T1 may be checked. The change in the speed in the time interval may be calculated as (Va−Vb)/T; i.e., (45.8324064−45.310716)/10. For the above example, the change in the speed may be determined as 0.05216904 kmph/s. Similarly, the change between the time interval Vb and Vc may be determined.

After determining the change in the speed between the time intervals using the slope check algorithm, a trend of the speed may be checked. The trend may indicate increase, decrease or average in the speed between the time intervals. In order to check the trend, the slope may be categorized based on an amount of change in the speed between the time intervals. In one implementation, if the slope is more than 4 Kmph the trend of the slope may be categorized as increasing. Further, if the slope is less than −4 Kmph, the trend of the slope may be categorized as decreasing. If the slope is between −4 Kmph and 4 Kmph, the trend of the slope may be categorized as being average. Although the slope is categorized at 4 Kmph it is obvious to configure the speed to calculate the slope based on the acceleration calculated from the speed.

After determining the slope using the slope check algorithm, the speed of the vehicle 250 at a sub-interval in the time interval may be estimated based on the slope of the time intervals. In one implementation, the speed of the vehicle 250 may be estimated based on the corrected speed. In one implementation, the speed of the vehicle 250 may be estimated using the corrected speed of a first time interval of the plurality of time intervals. In another implementation, for the first time interval, the speed of the vehicle 250 may be estimated using the corrected speed. For the subsequent time intervals, the speed of the vehicle 250 at each sub-interval may be estimated using the slope of the time intervals. In one embodiment, the speed of the vehicle 250 may be estimated at a sub-interval using a maximum of the forward speed and the backward speed of the sub-interval. In another embodiment, the speed of the vehicle 250 may be estimated using a minimum of the forward speed and the backward speed of the sub-interval. In order to use maximum or minimum of the forward speed and the backward speed of the sub-interval, the slope of the first time interval and a second time interval may be compared. The slope of the time intervals may be compared to check the trend of the slope. If the slope of the first time interval is increasing and the slope of the second time interval is averaging or decreasing, the speed of the vehicle at a given sub-interval may be determined using the maximum of the forward speed and the backward speed at the sub-interval. Similarly, if the slope of the first time interval is decreasing and the slope of the second time interval is averaging or increasing, the speed of the vehicle at a given sub-interval may be determined using the minimum of the forward speed and the backward speed at the sub-interval.

In order to explain estimating the speed, Table 5 may be used as an example. Referring to Table 5, it may be observed that the slope of the first time interval i.e., Va and Vb is increasing and the slope of the second time interval i.e., Vb and Vc is decreasing. Accordingly, for the time interval Vb and Vc, in order to estimate the speed at any given sub-interval in the second time interval (T1 to T2), the maximum of the forward speed and the backward speed may be used. For example, in order to estimate the speed at the sub-interval; e.g., $t_{15}$ the maximum of the forward speed and the backward speed, i.e., 48.62586968 may be used. Similarly, the speed at each sub-interval may be estimated by selecting the maximum of the forward speed and the backward speed.

Similarly, the slope of the second time interval i.e., Vb and Vc and the slope of the third time interval i.e., Vc and Vd may be checked. Referring to Table 5, it may be observed that the slope of the second time interval i.e., Vb and Vc is increasing and the slope of the third time interval Vc and Vd is decreasing/constant. For estimating the speed at any given sub-interval in the third time interval, the minimum of the forward speed and the backward speed may be used. For example, for the sub-interval $t_{24}$, the minimum of the forward speed and the backward speed, i.e., 47.68363735 may be used. Similarly, the speed at each sub-interval may be estimated by selecting the minimum of the forward speed and the backward speed.

If the slope between the consecutive time intervals is averaging, the speed of the vehicle 250 at each sub-interval may be estimated using the corrected speed as described above.

As the speed is estimated at each sub-interval corresponding to the acceleration, the speed may be obtained in a granular level. In other words, the speed may be obtained at a higher sampling rate by combining low frequency first sensor 254; e.g., GPS sensor and high frequency second sensor 256; e.g., accelerometer sensor.

The speed estimated at higher sampling rate may be used for driver profiling and/or for calculating insurance of the driver/vehicle. As the forward speeds and the backward speeds are integrated, the estimation of the speed is accurate. Further, sudden changes in the speed may be captured using the second sensor 256 even when values of the speed are not recorded by the first sensor 254. The sudden changes may be considered by assigning the weight at each sub-interval for the forward speed and the backward speed and using the slope of the time interval.

The speed estimated using the above example is compared with an OBD sensor to check an accuracy of the estimation. The OBD sensor comprises a GPS sensor with a higher sampling rate. The speed estimated using the OBD sensor and the speed estimated using the present disclosure is presented in Table 6.

TABLE 6

Table 6: Comparison of estimation of the speed

| Sub-interval | Acceleration (meter/second2 (m/s2)) | (Kilometre/hour (Kmph)) from OBD | Speed (Kmph) (Accelerometer and GPS data) |
|---|---|---|---|
| T0 | −0.174093583 | 45.8324064 | 45.8324064 |
| 1 | −0.053405703 | 46.9438164 | 45.96479853 |
| 2 | 0.262005459 | 46.1382336 | 45.31221239 |
| 3 | −0.144682252 | 44.6972868 | 44.82392403 |
| 4 | 0.014544619 | 44.7261408 | 44.78106518 |
| 5 | −0.340419738 | 45.4635828 | 45.09053381 |
| 6 | −0.191334703 | 46.2616488 | 45.77058522 |
| 7 | 0.003388594 | 47.2143528 | 45.83178164 |
| 8 | 0.037870831 | 47.3643792 | 45.48040809 |
| 9 | −0.140625515 | 46.586745 | 45.38825993 |
| T1 | 0.029757377 | 45.310716 | 45.310716 |
| 11 | −0.186263787 | 45.6870132 | 48.88460144 |
| 12 | 0.131175752 | 46.6823628 | 48.9837599 |
| 13 | 0.00541696 | 47.8416564 | 48.73789302 |
| 14 | 0.068296356 | 48.7370124 | 48.60520905 |
| 15 | −0.079774485 | 49.6314324 | 48.62586968 |
| 16 | −0.083831221 | 50.8410864 | 48.92035995 |
| 17 | 0.187970028 | 50.6915496 | 48.7329101 |
| 18 | 0.119005555 | 49.3020972 | 48.18035405 |
| 19 | 0.060182881 | 48.0665376 | 47.85781487 |
| T2 | 0.000346045 | 47.7488628 | 47.7488628 |
| 21 | 0.012516242 | 47.791341 | 47.72571068 |
| 22 | 0.035842465 | 47.6625096 | 47.63866501 |
| 23 | 0.036856658 | 47.9884824 | 47.50780659 |
| 24 | −0.134540412 | 48.4919838 | 47.68363735 |
| 25 | 0.002374411 | 48.9019896 | 47.92153615 |
| 26 | 0.229551589 | 48.8975004 | 47.50406935 |
| 27 | 0.053083609 | 49.1512464 | 46.99532599 |
| 28 | −0.016895089 | 49.3366284 | 46.93018666 |
| 29 | −0.040221312 | 49.4118936 | 47.03299618 |
| T3 | −0.197419808 | 49.3110576 | 49.3110576 |

From the Table 6, it may be observed that the speed estimated using the present disclosure is accurate when compared with the speed estimated using high sampling GPS sensor.

Figure 3:
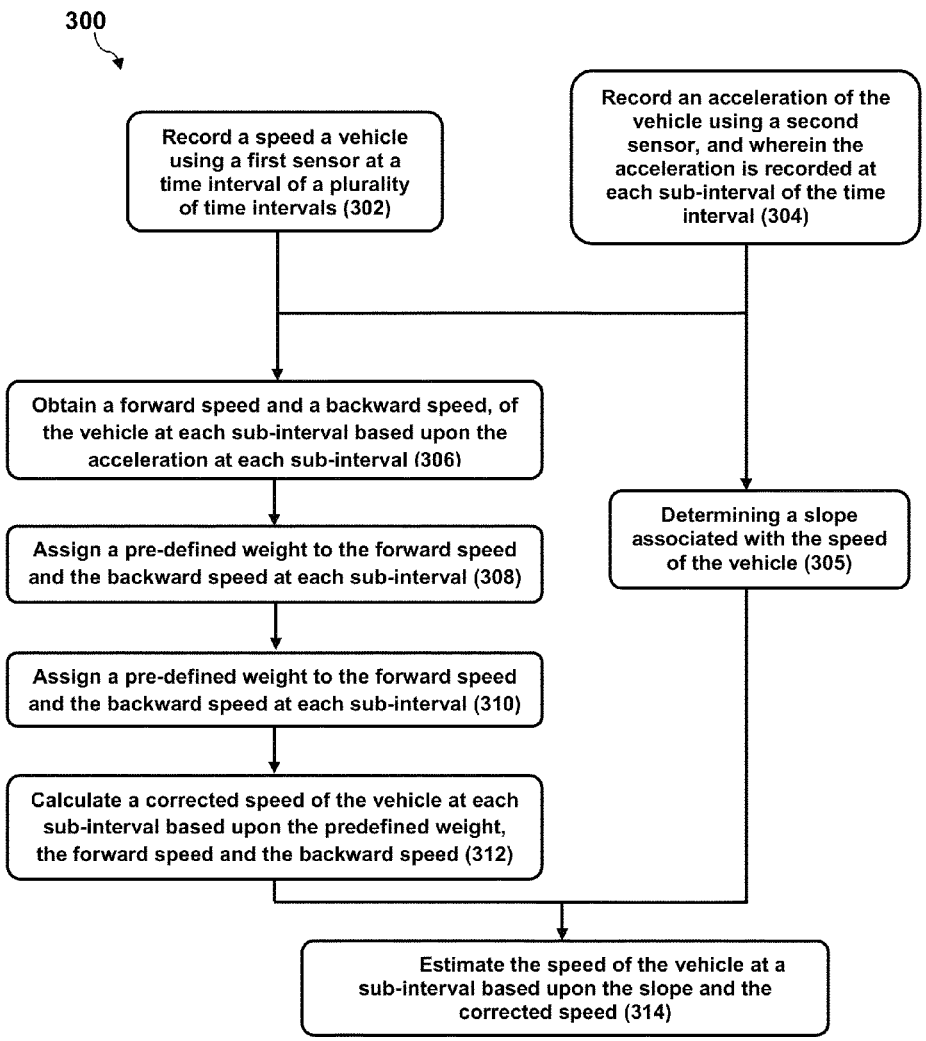
FIG. 3 shows a flowchart of a method for estimating speed of a vehicle, in accordance with an embodiment of the present disclosure.

Referring now to FIG. 3, a method 300 for estimating speed of a vehicle is shown, in accordance with an embodiment of the present disclosure. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the disclosure described herein. Furthermore, the method can be implemented in any suitable hardware, software, firmware, or combination thereof. However, for ease of explanation, in the embodiments described below, the method 300 may be considered to be implemented in the above described system 102.

At step/block 302, speed of a vehicle may be recorded using a first sensor at a time interval of a plurality of time intervals. The first sensor may be one of a GPS sensor and an INS sensor.

At step/block 304, an acceleration of the vehicle may be recorded using a second sensor. The acceleration is recorded at each sub-interval of the time interval. The second sensor may be one of an accelerometer and a MEMS.

At step/block 305, a slope associated with the speed of the vehicle may be determined The slope may indicate change in the speed of the vehicle between the plurality of time intervals.

At step/block 306, a forward speed and a backward speed, of the vehicle may be obtained. The forward speed and the backward speed may be obtained at each sub-interval based upon the acceleration at each sub-interval.

At step/block 308, a pre-defined weight may be assigned to the forward speed and the backward speed at each sub-interval.

At step/block 310, a corrected speed of the vehicle may be calculated at each sub-interval based upon the predefined weight, the forward speed and the backward speed.

At step/block 312, the speed of the vehicle at a sub-interval may be estimated based upon the slope. The speed may be estimated using one of the corrected speed at the sub-interval, minimum of the forward speed and the backward speed in the time interval, and maximum of the forward speed and the backward speed, in the time interval.

Although implementations for methods and systems for estimating speed of a vehicle have been described in language specific to structural features and/or methods, it is to be understood that the appended claims are not necessarily limited to the specific features or methods described. Rather, the specific features and methods are disclosed as examples of implementations for estimating speed of a vehicle.

We claim:

1. A method for estimating speed of a vehicle, the method comprising:
recording, by a processor, a speed of a vehicle using a first sensor at a time interval of a plurality of time intervals and at each sub-interval of the time interval; recording, by the processor, an acceleration of the vehicle using a second sensor, wherein the acceleration is recorded at the each sub-interval of the time interval; obtaining, by the processor, a forward speed and a backward speed, of the vehicle at the each sub-interval based upon the acceleration at the each sub-interval; assigning, by the processor, a pre-defined weight to the forward speed and the backward speed at the each sub-interval; calculating, by the processor, a corrected speed of the vehicle at the each subinterval based upon the pre-defined weight, the forward speed and the backward speed; determining, by the processor, a slope associated with the speed of the vehicle, wherein the slope indicates change in the speed of the vehicle between the plurality of time intervals; and estimating, by the processor, the speed of the vehicle at a sub-interval based upon the slope, wherein the speed is estimated using one of the following: corrected speed at the sub-interval, a minimum of the forward speed and the backward speed in the time interval, and a maximum of the forward speed and the backward speed in the time interval, wherein the speed is estimated using the maximum of the forward speed and the backward speed in the time interval when the change in the speed increases between the plurality of time intervals; and wherein the speed is estimated using the minimum of the forward speed and the backward speed in the time interval when the change in the speed decreases between the plurality of time intervals.

2. The method of claim 1, wherein the first sensor is one of a Global Positioning System (GPS) sensor and an Inertial Navigation System (INS) sensor.

3. The method of claim 1, wherein the second sensor is one of an accelerometer, and a Micro-Electro-Mechanical Systems (MEMS).

4. A system for estimating speed of a vehicle, the system comprising: a processor; and a memory coupled to the processor, wherein the processor executes program instructions stored in the memory, to: record a speed of a vehicle using a first sensor at a time interval of a plurality of time intervals and at each sub-interval of the time interval; record an acceleration of the vehicle using a second sensor, and wherein the acceleration is recorded at the each sub-interval of the time interval; obtain a forward speed and a backward speed, of the vehicle at the each sub-interval based upon the acceleration at the each sub-interval; assign a predefined weight to the forward speed and the backward speed at the each sub-interval; calculate a corrected speed of the vehicle at the each sub-interval based upon the predefined weight, the forward speed and the backward speed; determine a slope associated with the speed of the vehicle, wherein the slope indicates change in the speed of the vehicle between the plurality of time intervals; estimate the speed of the vehicle at a sub-interval based upon the slope, wherein the speed is estimated using one of the following: corrected speed at the sub-interval, a minimum of the forward speed and the backward speed in the time interval, and a maximum of the forward speed and the backward speed in the time interval, wherein the speed is estimated using the maximum of the forward speed and the backward speed in the time interval when the change in the speed increases between the plurality of time intervals; and wherein the speed is estimated using the minimum of the forward speed and the backward speed in the time interval when the change in the speed decreases between the plurality of time intervals.

5. The system of claim 4, wherein the first sensor is one of a Global Positioning System (GPS) sensor an Inertial Navigation System (NS) sensor.

6. The system of claim 4, wherein the second sensor is one of an accelerometer, and a Micro-Electro-Mechanical Systems (MEMS).

7. A non-transitory computer readable medium embodying a program executable in a computing device for estimating speed of a vehicle, the program comprising: a program code for recording a speed of a vehicle using a first sensor at a time interval of a plurality of time intervals and at each sub-interval of the time interval; a program code for recording an acceleration of the vehicle using a second sensor, and wherein the acceleration is recorded at each sub-interval of the time interval; a program code for obtaining a forward speed and a backward speed, of the vehicle at each sub-interval based upon the acceleration at each sub-interval; a program code for assigning a predefined weight to the forward speed and the backward speed at each sub-interval; a program code for calculating a corrected speed of the vehicle at each subinterval based upon the predefined weight, the forward speed and the backward speed; a program code for determining a slope associated with the speed of the vehicle, wherein the slope indicates change in the speed of the vehicle between the plurality of time intervals; a program code for estimating the speed of the vehicle at a sub-interval based upon the slope, wherein the speed is estimated using one of the following: corrected speed at the sub-interval, a minimum of the forward speed and the backward speed in the time interval, and a maximum of the forward speed and the backward speed in the time Interval, wherein the speed is estimated using the maximum of the forward speed and the backward speed in the time interval when the change in the speed increases between the plurality of time intervals: and wherein the speed is estimated using the minimum of the forward speed and the backward speed in the time interval when the change in the speed decreases between the plurality of time intervals.

* * * * *